United States Patent
Brown et al.

(10) Patent No.: US 9,634,948 B2
(45) Date of Patent: Apr. 25, 2017

(54) MANAGEMENT OF ADDRESSES IN VIRTUAL MACHINES

(71) Applicant: International Business Machines Corporation, Armonk, NY (US)

(72) Inventors: Deanna L. Q. Brown, Queen Creek, AZ (US); Susan F. Crowell, Rochester, MN (US); Jason A. Nikolai, Rochester, MN (US); Andrew T. Thorstensen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/074,178

(22) Filed: Nov. 7, 2013

(65) Prior Publication Data

US 2015/0128245 A1    May 7, 2015

(51) Int. Cl.
*H04L 12/823* (2013.01)
*H04L 12/721* (2013.01)
(Continued)

(52) U.S. Cl.
CPC ............ *H04L 47/323* (2013.01); *G06F 9/455* (2013.01); *G06F 9/45558* (2013.01);
(Continued)

(58) Field of Classification Search
CPC ............ H04L 63/0236; H04L 63/0227; H04L 63/1466; H04L 12/26; H04L 41/0213;
(Continued)

(56) References Cited

U.S. PATENT DOCUMENTS

| 7,643,482 B2 | 1/2010 | Droux et al. |
| 7,870,603 B2 | 1/2011 | Foschiano et al. |

(Continued)

FOREIGN PATENT DOCUMENTS

| CN | 1901511 A | 1/2007 |
| CN | 102710814 A | 10/2012 |

(Continued)

OTHER PUBLICATIONS

IBM, "Software Defined Networking", http://www-03.ibm.com/systems/networking/solutions/sdm.html.
(Continued)

*Primary Examiner* — Carl Colin
*Assistant Examiner* — Vance Little
(74) *Attorney, Agent, or Firm* — Robert J. Shatto

(57) ABSTRACT

Methods for managing an address on a switching device, managing an address on a network switch, and screening addresses in a cloud computing environment are provided. One embodiment is directed towards a computer-implemented method for managing an address on a switching device that is communicatively coupled to a plurality of virtual machines. The method includes accessing an address pool that includes an assigned address for each virtual machine from the plurality of virtual machines. The method includes determining, on the switching device, a used address for the virtual machine from the plurality of virtual machines. The method includes determining whether the used address is matching the assigned address for each virtual machine. The method also includes routing traffic from the virtual machine to a hypervisor in response to the used address matching the assigned address.

8 Claims, 10 Drawing Sheets

(51) Int. Cl.
   *G06F 9/455* (2006.01)
   *H04L 12/931* (2013.01)
   *H04L 29/12* (2006.01)
   *G06F 15/173* (2006.01)
   *H04L 29/06* (2006.01)

(52) U.S. Cl.
   CPC .............. *H04L 45/72* (2013.01); *H04L 49/00* (2013.01); *H04L 49/70* (2013.01); *H04L 61/2015* (2013.01); *H04L 63/0245* (2013.01); *G06F 15/173* (2013.01); *G06F 2009/45595* (2013.01); *H04L 61/2053* (2013.01); *H04L 61/2061* (2013.01); *H04L 63/0227* (2013.01); *H04L 63/0236* (2013.01); *H04L 63/1466* (2013.01)

(58) Field of Classification Search
   CPC . H04L 41/0803; H04L 47/323; G06F 15/173; G06F 9/455; G06F 21/00
   See application file for complete search history.

(56) References Cited

U.S. PATENT DOCUMENTS

| | | | |
|---|---|---|---|
| 8,166,474 B1 | 4/2012 | Delco et al. | |
| 8,549,187 B1* | 10/2013 | Christopher | H04L 61/103 709/220 |
| 8,619,771 B2 | 12/2013 | Lambeth et al. | |
| 8,667,187 B2 | 3/2014 | Thakkar | |
| 8,879,549 B2 | 11/2014 | Raman et al. | |
| 8,879,554 B2 | 11/2014 | Emmadi et al. | |
| 9,104,460 B2 | 8/2015 | Jansen | |
| 2007/0282782 A1 | 12/2007 | Carey et al. | |
| 2008/0163207 A1 | 7/2008 | Reumann et al. | |
| 2008/0229415 A1* | 9/2008 | Kapoor | G06F 21/55 726/22 |
| 2010/0223397 A1* | 9/2010 | Elzur | H04L 41/0213 709/235 |
| 2011/0022694 A1 | 1/2011 | Dalal et al. | |
| 2011/0022695 A1* | 1/2011 | Dalal | G06F 9/5077 709/222 |
| 2011/0035494 A1 | 2/2011 | Pandey et al. | |
| 2011/0103259 A1 | 5/2011 | Aybay et al. | |
| 2011/0299413 A1 | 12/2011 | Chatwani et al. | |
| 2011/0320632 A1 | 12/2011 | Karino | |
| 2012/0005724 A1* | 1/2012 | Lee | 726/1 |
| 2012/0216194 A1 | 8/2012 | Hadas et al. | |
| 2012/0287931 A1* | 11/2012 | Kidambi | H04L 49/602 370/392 |
| 2012/0317611 A1 | 12/2012 | Kashyap | |
| 2013/0016723 A1 | 1/2013 | Arad et al. | |
| 2013/0018765 A1 | 1/2013 | Fork et al. | |
| 2013/0086584 A1 | 4/2013 | Akiyama et al. | |
| 2013/0132952 A1 | 5/2013 | Shah | |
| 2013/0148653 A1 | 6/2013 | Howard et al. | |
| 2013/0148654 A1 | 6/2013 | Sayani et al. | |
| 2013/0148669 A1 | 6/2013 | Noguchi et al. | |
| 2013/0254891 A1* | 9/2013 | Onoda | H04L 12/44 726/23 |
| 2013/0262711 A1* | 10/2013 | Louzoun et al. | 710/9 |
| 2013/0263125 A1 | 10/2013 | Shamsee et al. | |
| 2014/0003428 A1 | 1/2014 | Li et al. | |
| 2014/0025821 A1 | 1/2014 | Baphna et al. | |
| 2014/0056141 A1 | 2/2014 | Breternitz et al. | |
| 2014/0059544 A1 | 2/2014 | Koganty et al. | |
| 2014/0115578 A1 | 4/2014 | Cooper et al. | |
| 2014/0156818 A1 | 6/2014 | Hunt | |
| 2014/0189050 A1 | 7/2014 | Rijsman et al. | |
| 2014/0215463 A1 | 7/2014 | Hendel et al. | |
| 2015/0082417 A1 | 3/2015 | Bhagwat et al. | |
| 2015/0127830 A1 | 5/2015 | Brown et al. | |
| 2015/0135178 A1 | 5/2015 | Fischer et al. | |

FOREIGN PATENT DOCUMENTS

| | | |
|---|---|---|
| CN | 102790716 A | 11/2012 |
| CN | 103138990 A | 6/2013 |
| EP | 2579527 A1 | 4/2013 |
| EP | 2852107 A1 | 3/2015 |
| WO | 2013/189059 A1 | 12/2013 |

OTHER PUBLICATIONS

McGillicuddy, S., "IBM Dove: Big Blue enters the network virtualization battleground", SearchSDN.com, TechTarget, Published Sep. 2012, Copyright 2013 TechTarget. http://searchsdn.techtarget.com/feature/IBM-DOVE-Big-Blue-enters-the-network-virtualization-battleground.

Mell et al., "The NIST Definition of Cloud Computing", National Institute of Standards and Technology, NIST Special Publication 800-145, Sep. 2011, Gaitersburg, MD.

Onoue et al., "Host-based Multi-tenant Technology for Scalable Data Center Networks", ANCS'12: Proceedings of the eighth ACM/IEEE symposium on architectures for networking and communications systems, Oct. 2012, pp. 87-98, © 2012 ACM. DOI: 10.1145/2396556.2396577.

Sabahi, F., "Secure Virtualization for Cloud Environment Using Hypervisor-based Technology", International Journal of Machine Learning and Computing, pp. 39-45, vol. 2, No. 1, Feb. 2012, (Received Nov. 24, 2011, Revised Jan. 8, 2012).

Singh et al., "Detection of Spoofing attacks in Wireless network and their Remedies", IJRREST: International Journal of Research Review in Engineering Science and Technology, vol. 1, Issue 1, Jun. 2012, pp. 1-5.

Office Action dated Dec. 19, 2014 for U.S. Appl. No. 14/136,022.

Brown et al., "Management of Addresses in Virtual Machines", U.S. Appl. No. 14/136,022, filed Dec. 20, 2013.

International Search Report dated Jan. 27, 2015 for International Application PCT/CN2014/088999.

Hudson et al., "Edge Virtual Bridging with VEB and VEPA," May 2009, Hewlett Packard, 92 pages.

Cisco Systems, Inc., "Cisco UCS Manager GUI Configuration Guide, Release 1.4," Apr. 27, 2011, pp. 1-2.

List of IBM Patents or Patent Applications Treated as Related, Aug. 8, 2016, 2 pgs.

* cited by examiner

MANAGEMENT OF ADDRESSES IN VIRTUAL MACHINES

TECHNICAL FIELD

This disclosure generally relates to the field of information processing systems, and more particularly relates to managing access of virtual machines on a network.

BACKGROUND

Virtual machines (abbreviated VM herein) may help to more efficiently use hardware resources by allowing one computer system to support functions normally performed by multiple separate computer systems. By virtualizing a hardware resource, a single hardware resource may support multiple virtual machines in a flexible manner that provides improved utilization of the hardware resource. Further, if a physical processing resource becomes over-utilized, virtual machines may migrate to other hardware resources that may have processing capacity.

SUMMARY

A method for managing an address on a switching device, a method for managing an address on a network switch, and a method for screening addresses in a cloud computing environment are provided.

One embodiment is directed towards a computer-implemented method for managing an address on a switching device that is communicatively coupled to a plurality of virtual machines. The method includes accessing an address pool that includes a set of assigned addresses for each virtual machine from the plurality of virtual machines. The method includes determining, on the switching device, a used address for the virtual machine from the plurality of virtual machines. The method includes determining whether traffic originating from the virtual machine with the used address is matching the properly assigned address then take an action for traffic in violation. The method can specify the action such as blocking the traffic from the network and sending a message to the notification service that the action has occurred. The method also includes routing traffic from the virtual machine to a hypervisor in response to the used address matching the assigned address.

Another embodiment is directed towards a method for managing an address on a network switch that connects a first network and a second network. The method includes accessing a first compilation of assigned addresses assigned to each virtual machine from a plurality of virtual machines on the first network. The method includes determining whether a used address for a second virtual machine on the second network is matching an assigned address for a first virtual machine from the first compilation. The method includes routing traffic to the second virtual machine in second network in response to the used address for the second virtual machine not matching the assigned address for the first virtual machine from the first compilation.

Another embodiment is directed towards a system for screening addresses in a cloud computing environment.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

Aspects of the present disclosure can be directed toward a method of managing Internet Protocol (IP) or Media Access Control (MAC) address in virtual machines using a screening function. The IP and MAC address can be referred to generically as an address. The screening function can block an unassigned address by comparing the address assigned to a virtual machine to the address used by the virtual machine, i.e., a used address. The screening function can be performed by a switching device. The switching device can access an address pool, which is a listing or compilation of all of the addresses associated with each virtual machine that routes through the edge ports on the device. The addresses in the address pool can be built either through Dynamic Host Control Protocol (DHCP) or via contact with a cloud controller. Although not necessarily limited thereto, embodiments of the present disclosure can be appreciated in the context of managing virtual machine access through an address monitored on the switching device.

The screening function can block virtual machines using unauthorized addresses from accessing hardware resources of other virtual machines. In various embodiments, the screening function can isolate the virtual machine using the unauthorized address from the network as a whole. By placing the screening function on the switching device, the processing load can be reduced on a hypervisor as well as limited to a subset of administrative superusers. According to various embodiments, a cloud controller can also be notified of activation of the screening function.

In the descriptions provided herein, specific details of various embodiments are provided. However, various embodiments may be practiced with less than all of these specific details. In other instances, certain methods, procedures, components, structures, and/or functions are described in no more detail than to enable the various embodiments of the disclosure, for the sake of brevity and clarity.

Virtual machines (VMs) can share access to one or more hardware resources. Consistent with various embodiments, a hardware resource can be capable of supporting a particular number of VMs (e.g., before significant degradation of VM performance). The hardware resources that support one or more VMs can be distributed throughout an operating environment. In various embodiments, the hardware resource can include one or more processors devoted to processing computer instructions. For example, a hardware resource can include a processor core, a network adapter, a server blade, input/output devices, a computer, a laptop, processing access time to a mainframe, or combinations thereof.

Figure 1:
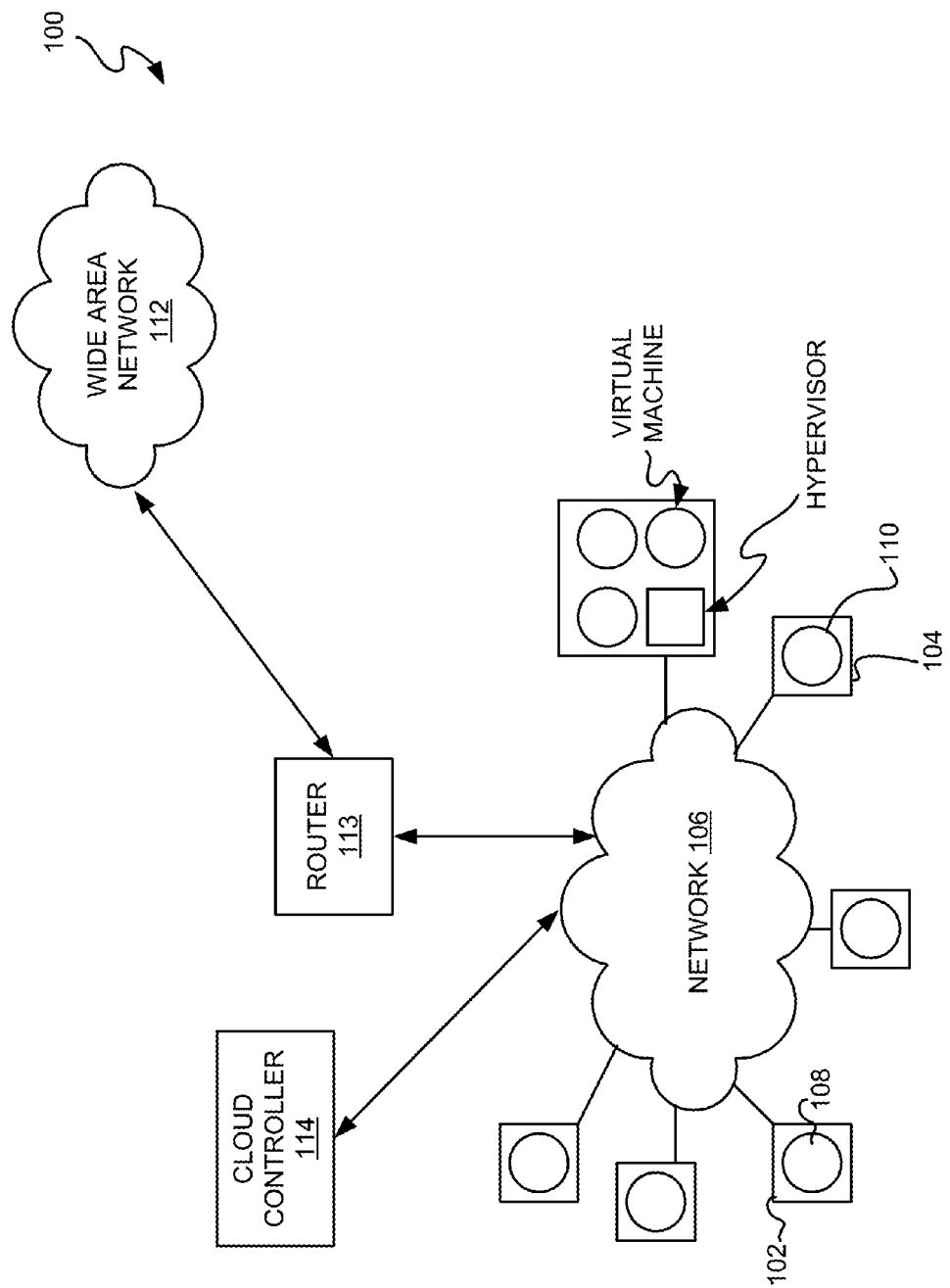
FIG. 1 illustrates an operating environment, according to various embodiments.

FIG. 1 illustrates an operating environment, according to various embodiments. In particular, FIG. 1 shows an operating environment 100 comprising a plurality of hardware resources such as a first hardware resource 102 and a second hardware resource 104. It should be noted that for simplicity only the first and second hardware resource 102, 104 have been explicitly identified in FIG. 1 to represent the plurality of hardware resources illustrated. Consistent with embodiments, the hardware resources 102, 104 can include (data) server devices, processor cores, I/O devices, storage devices and combinations thereof. Each of the plurality of hardware resources 102, 104 can be communicatively coupled to a network 106. The network 106 can refer at least to a data center network, a cloud network, or a cloud-computing network. The 106 can comprise, but is not limited to, a three-tier architecture. Network 106 can use a variety of protocols and architectures including, but not limited to, are Ethernet, Virtual Local Area Network (VLAN), Virtual Layer 2 (VL2), PortLand, or BCube.

The network 106 can further communicate with a cloud controller 114. The cloud controller 114 is the front-end system responsible for gathering and aggregating preliminary data required to start a provisioning process. Initially, this information can be provided by an administrator as part of the creation process and is specific to each type of workflow used for provisioning. For example, the cloud controller 114 can gather information that includes VM location, class of application (web server, database server, mail server, etc.), and minimum resource requirements. The cloud controller 114 can further communicate with a wide-area network 112 such as the internet through a router 113.

In various embodiments, the hardware resources 102, 104 in the plurality of hardware resources can use one or more virtual machines (VMs) 108, 110. The virtual machine is a software-based computer. Virtual machines may be based on specifications of a hypothetical computer or emulate the computer architecture and functions of a real world computer. Each virtual machine can interface with the hardware resource through the hypervisor. The hypervisor can be software, firmware, or hardware or a combination thereof that is configured to create and run VMs. The hypervisor can map the VM to the hardware resource.

A virtual machine can be migrated from one hypervisor mapped to a hardware resource to another hypervisor mapped to another hardware resource to allow more virtual machines using fewer hardware resources. As a virtual machine is migrated from one hypervisor to another, then a new switching device that is a part of the new hypervisor (discussed herein) can associate with the migrated VM. The switching device is not moved.

A virtual machine can be deactivated by the cloud controller 114. In various embodiments, the network 106 can be turned over/reset at periodic intervals. For example, the data center network 106 can have a policy where the network 106 is reset at least once per month. Other data center networks can reset the network 106 at different time intervals, e.g., multiple times per day. The switching device can have enforcement of the screening function deactivated while the traffic is turned off.

Figure 2:
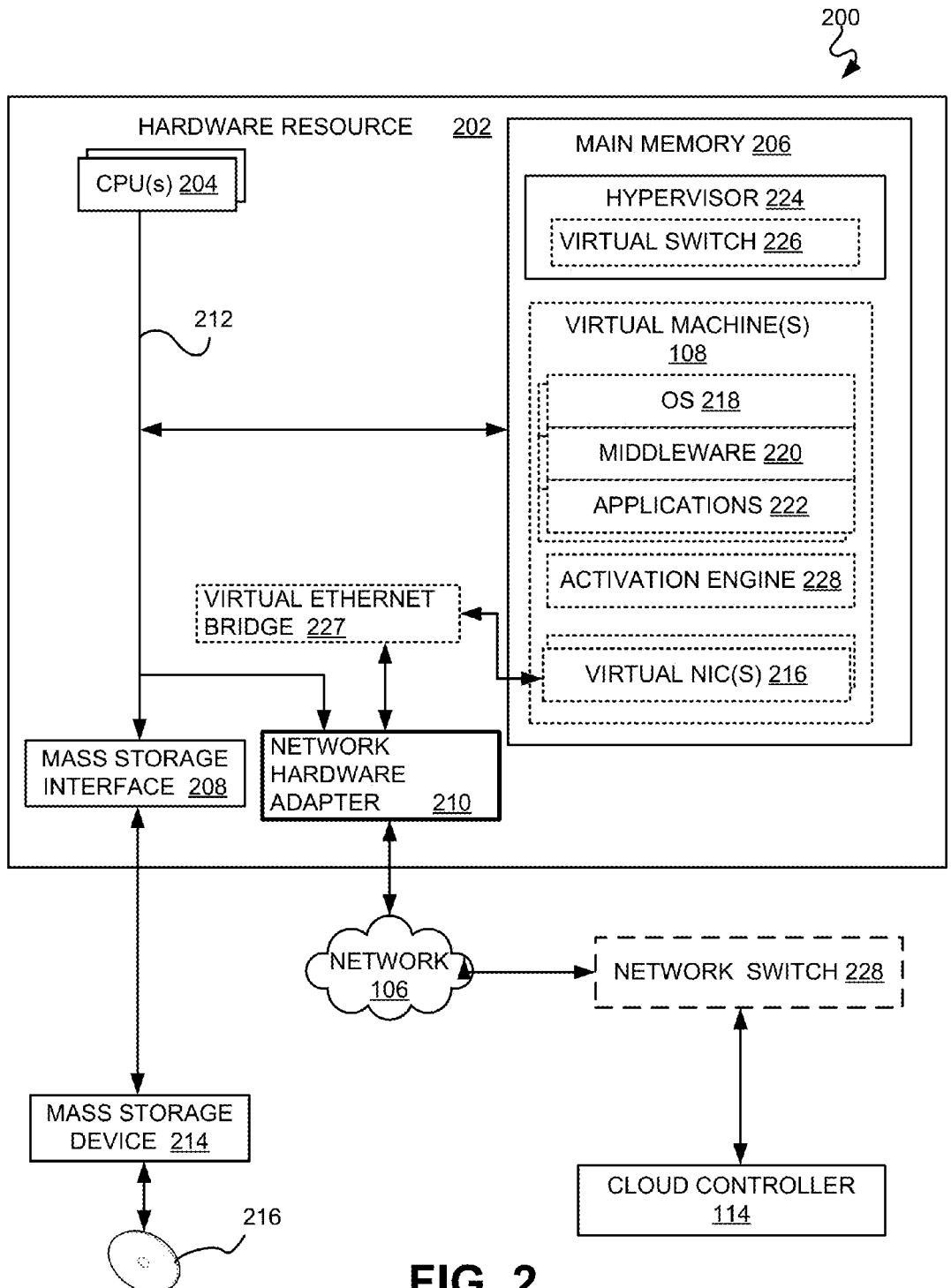
FIG. 2 illustrates a block diagram illustrating a detailed view of hardware resources from an operating environment, according to various embodiments.

FIG. 2 illustrates a block diagram 200 illustrating a detailed view of a hardware resource, according to various embodiments. The computer 202 illustrated in FIG. 2 is an example of an embodiment of the hardware resources of FIG. 1, such as hardware resources 102, 104. The computer 202 has a processor(s) 204 that is connected to a main memory 206, mass storage interface 208, and network adapter hardware 210. A system bus 212 interconnects these system components. The mass storage interface 208 is used to connect mass storage devices, such as mass (data) storage device 214, to the hardware resource 202. One specific type of data storage device is an optical drive such as a CD/DVD drive, which can be used to store data to and read data from a computer readable medium or storage product such as (but not limited to) a CD/DVD 216. Another type of data storage device is a data storage device configured to support, for example, NTFS type file system operations.

Although only one CPU 204 is illustrated for the hardware resource 202, computer systems with multiple CPUs can be used equally effectively. Various embodiments of the present invention are able to use any other suitable operating systems as well. The network adapter hardware 210 is used to provide an interface to one or more networks 106. Various embodiments of the present invention are able to be adapted to work with any data communications connections including present day analog and/or digital techniques or via a future networking mechanism. Although one or more embodiments of the present invention are discussed in the context of a fully functional computer system, those skilled in the art will appreciate that embodiments are capable of being distributed as a program product via CD or DVD, e.g., CD 216, CD ROM, or other form of recordable media, or via any type of electronic transmission mechanism.

The main memory 206 can include several software applications such as those denoted with dashed lines. The main memory 206 can include a hypervisor 224, a virtual machine 108 and a virtual Network Interface Card (vNIC) 216. A virtual machine 108 can be a discrete execution environment within a single computer to make the computer function as if it were two or more independent computers. Each virtual machine 108 is assigned the resources it needs to operate as though it were an independent computer, including processor time, memory, an operating system, and the like. Each virtual machine 108 includes an operating system 218, middleware 220, applications 222, an activation engine 228, and the like. Each virtual machine 108 can support specific guest operating systems and multiple user sessions for executing software written to target the guest operating systems. For example, one virtual machine can support an instance of the Linux® operating system, while a second virtual machine executes an instance of the z/OS® operating system. Other guest operating systems can also be supported as well.

The operating system 218 is a layer of system software that schedules threads and provides functions for making system resources available to threads, including memory access, access to input/output resources, and the like. The operating system 218 can also control allocation and authorization for access to computer resources. The operating system 218 can perform low-level basic tasks such as recognizing input from a keyboard, sending output to a display screen, keeping track of files and directories on a magnetic disk drive, and controlling peripheral devices such as disk drives and printers.

The operating system 218 is also responsible for security, ensuring that unauthorized users do not access the system and that threads access only resources they are authorized to access. Operating systems useful for scheduling threads in a multi-threaded computer according to embodiments of the present invention are multi-threading operating systems, examples of which include UNIX®, Linux®, Microsoft NT™, AIX®, IBM's i5/OS™, and many others. The middleware 220 is software that connects multiple software applications for exchanging data. Middleware 220 can include application servers, content management systems, web servers, and the like. Applications 222 are any software programs running on top of the middleware 220.

A virtual machine 108 can also have an activation engine 228. The activation engine 228 can be used by the virtual machine 108 to set addresses in a static configuration, discussed further herein. The activation engine 228 can create, read, and execute metadata specified in a configuration. The activation engine 228 is an enablement framework used for boot-time customization of virtual images that is processed after the initial system boot. It is used to customize the configuration settings of a system by performing functions, such as starting the network interface, creating non-default user accounts along with their permissions, and creating new file systems.

The activation engine 228, along with the virtual image templates, allows a system administrator to use a single virtual image as a source of deployment for multiple systems that can be customized with their own parameters, such as network addresses, custom file systems, and user accounts. The activation engine 228 is fully expandable, which means that the default virtual image template can be modified to add custom rules, execute custom scripts, or even add new templates that are processed at boot time.

The activation engine 228 script can be used to parse the default virtual image template file, process all rules, and execute subsequent scripts that are linked to the processed rules. The activation engine 228 supports the XML format of the template, which serves as a launch pad for calling pre-defined or user-created system customization scripts, with the script parameters being hosted in the virtual image template. The activation engine 228 can also use comma-separated value format, etc. The activation engine 228 can also apply the address received from the cloud controller 114. According to various embodiments, the activation engine 228 may not be required by the virtual machine 108 if further customization is not required. For example, if the virtual machine uses DHCP and does not need to do anything when it boots, then an activation engine 228 may not even be required.

The main memory 206 also includes a hypervisor 224. The hypervisor 224 is a layer of system software, firmware, or hardware that runs under the operating system and the virtual machines 108. That is, a hypervisor 224 runs between an operating system 218 and underlying hardware resources including physical processors 204. The hypervisor 224, among other things, can manage virtual machines 108. Although only one hypervisor 224 is shown, each virtual machine 108 can also have its own hypervisor.

The hypervisor 224 can host a virtual switch 226. The virtual switch 226 can communicate with the virtual Network Interface Card (vNIC) 216 from the virtual machine 108. The virtual switch 226 can allow one or more virtual machines to communicate with the hypervisor 224. According to various embodiments, the screening function on the virtual switch 226 can be deactivated whenever the virtual machine 108 is being reset. For example, whenever the virtual machines 108 are being deleted, then the enforcement of addresses can be suspended.

The hardware resource 202 can have a network hardware adapter 210 to manage the communication between the virtual machine 108 and the network 106. The network hardware adapter 210 can be a network interface card or another device. In various embodiments, a virtual network interface card (vNIC) can map to the network hardware adapter 210. The virtual machine 108 can use a vNIC 216 to access the network 106. In various embodiments, the network hardware adapter 210 can be a Single Root Input/Output Virtualization (SRIOV)—enabled device. The SRIOV-enabled device can include a network interface card. The network hardware adapter 210 can communicate with the virtual ethernet bridge 227. The virtual ethernet bridge 227 can act as a switching layer for an SRIOV NIC and directly connect to the vNIC 216 from a virtual machine 108. In various embodiments, the virtual ethernet bridge 227 can be a part of the network hardware adapter 210. Each virtual machine 108 can have more than one vNIC 216 which can allow the virtual machine 108 to access more than one hypervisor 224 or network 106.

The hardware resource 202 can further connect with a network switch 228. The network switch 228 can be a hardware-based switch that can connect multiple networks to each other. The network switch 228 can be a network device that complies with the IEEE™ 802.1 Qbg standard. In various embodiments, the network switch 228 can also comply with the IEEE™ 802.1 Qbh Bridge port extension standard. The cloud controller 114 can connect to the network 106 through the network switch 228. In various embodiments, the physical switch can be optional and can depend on whether the cloud controller 114 controls more than one cloud. Using the IEEE™ 802.1 Qbg standard can further involve the use of a Virtual Ethernet Port Aggregator (VEPA) instead of the virtual ethernet bridge 227.

As mentioned herein, the screening function can block off virtual machine network traffic that is using unassigned addresses from accessing a network. The screening function can access an address pool and compare the addresses assigned to the virtual machine from the address pool against an address used by the virtual machine. The screened virtual machine will not be able to access the network.

In various embodiments, the screening function can be performed by a switching device, e.g., the virtual switch 226, the virtual ethernet bridge 227, or the network switch 228 which can collectively be referred to as a switching device. For example, the screening function described herein, can be performed by the virtual switch 226 by having the virtual switch 226 monitor the vNIC 216 for each virtual machine. The screening function can also be performed by the network switch 228 by having the network switch 228 screen network traffic between networks, e.g., between 106 and 112 in FIG. 1. The screening function can also be performed by the network hardware adapter 210 by screening addresses at the underlying network hardware device, e.g., the network hardware adapter 210 that is shared by multiple virtual machines.

Figure 3:
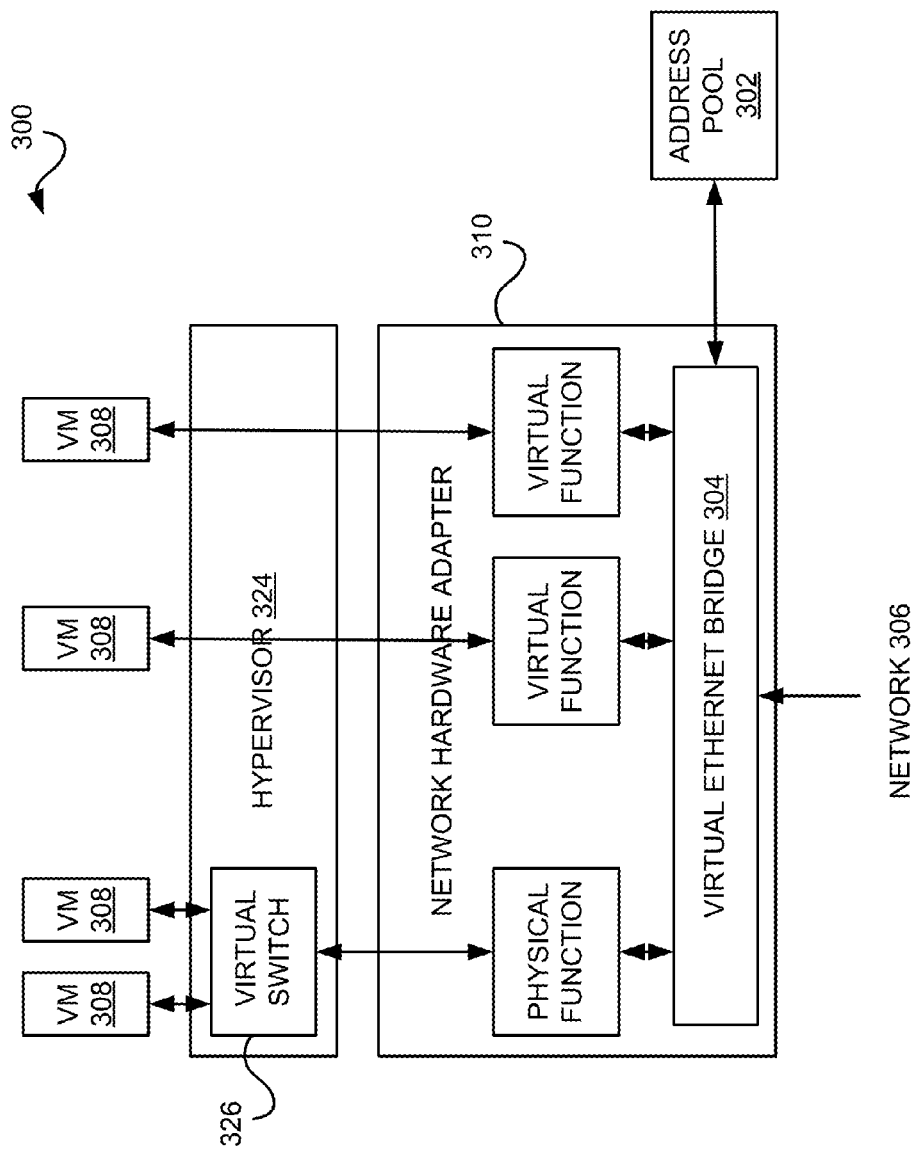
FIG. 3 illustrates a block diagram of a Single Root Input/Output Virtualization (SRIOV)-enabled system that uses the screening function, according to various embodiments.

FIG. 3 illustrates a block diagram of a SRIOV-enabled system 300 that uses the screening function, according to various embodiments. The SRIOV-enabled system 300 can generally be configured to receive addresses from an address pool 302 at the network hardware adapter 310. The address pool 302 can contain a listing or compilation of MAC addresses or IP addresses used by the virtual machines. According to various embodiments, the address pool 302 can be a listing of MAC addresses or IP address available to the virtual machines. The address pool 302 can be populated using a variety of techniques described herein.

The system 300 can include the network hardware adapter 310. The network hardware adapter can be configured in a similar manner to the network hardware adapter 210 in FIG. 2. The network hardware adapter can perform one or more virtual functions and physical functions. The physical and virtual functions can communicate with the virtual ethernet bridge 304. The virtual ethernet bridge 304 can allow various virtual machines 308 to access the network 306. The virtual machines 308 can be configured in a similar manner to the virtual machine 108 from FIG. 2. The network 306 can be configured in a similar manner to the network 206 from FIG. 2.

The system 300 can also include the hypervisor 324. The hypervisor 324 can be configured in a similar manner to the hypervisor 224 in FIG. 2. The hypervisor 324 can also include a virtual switch 326. The virtual switch 326 can be configured in a similar manner to the virtual switch 226 in FIG. 2. In various embodiments, the virtual switch 326 can operate in layer 2 communication layer. The virtual switch 326 can provide access to the physical function of the network hardware adapter 310 to a plurality of virtual machines 308.

In SRIOV, the virtual machine 308 can communicate with the virtual function of a network hardware adapter 310 directly by bypassing the hypervisor 324. The virtual function can communicate with the virtual ethernet bridge 304. In various embodiments, the screening function can be performed by the virtual ethernet bridge 304 of the SRIOV. The virtual ethernet bridge 304 can compare the address for the virtual machine 308 against the addresses in the address pool 302.

Figure 4:
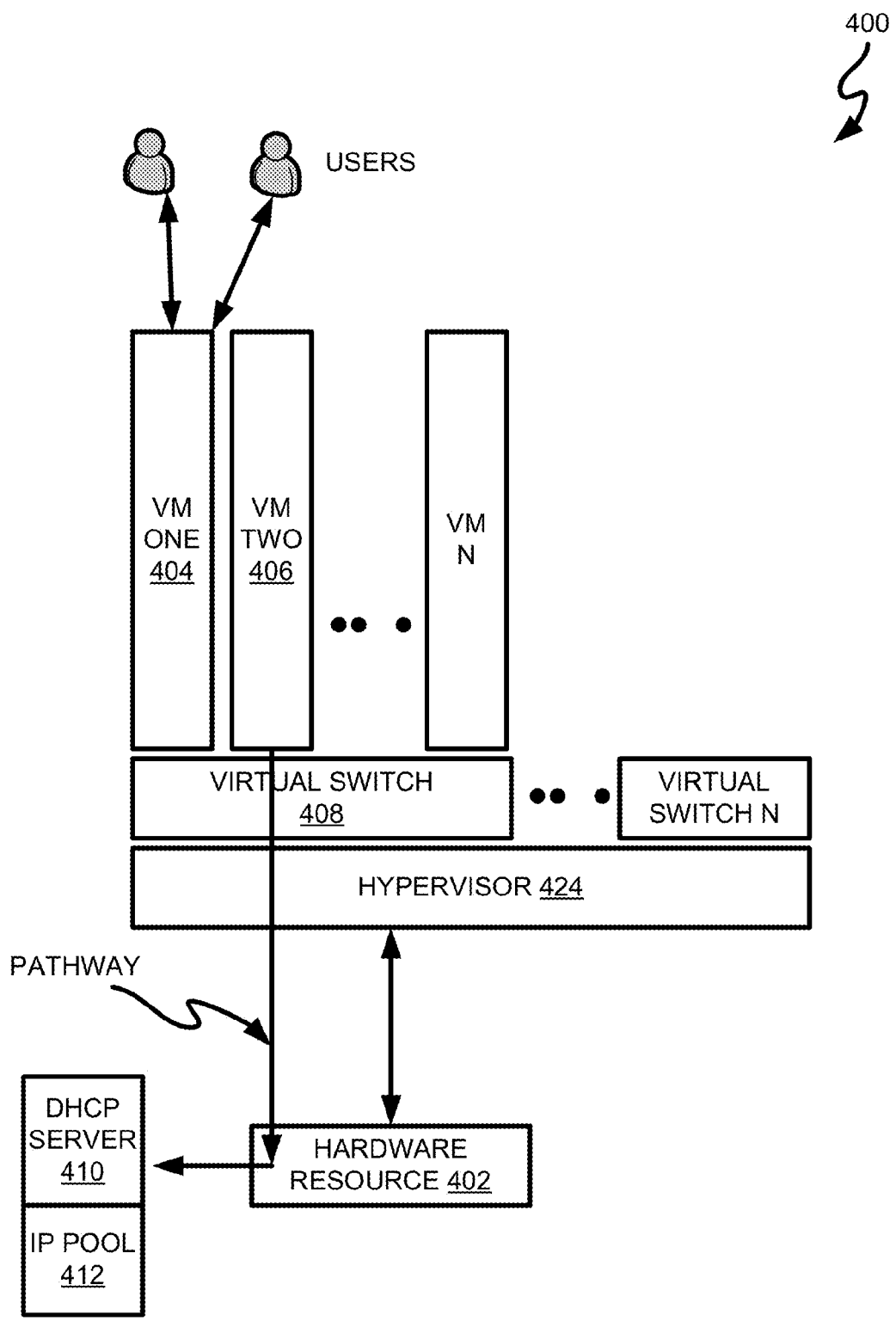
FIG. 4 illustrates a block diagram of a system that provides dynamic assignment of IP addresses, according to various embodiments.

FIG. 4 illustrates a block diagram of a system 400 that provides dynamic assignment of IP addresses, according to various embodiments. The system 400 is illustrated using a virtual switch 408 to perform the screening function described herein and other configurations are contemplated. However, various embodiments are implemented on physical switches and may connect physical systems, e.g., blade computers. Although the virtual machines are illustrated as connecting to a single hypervisor 424, it is possible for each virtual machine to have more than one vNIC to connect to more than one cloud network. The system 400 can use the virtual switch 408 as the switching device. The system 400 can have components similar to FIG. 2. For example, the hardware resource 402 can correspond to the hardware resource 202 in FIG. 2. The hypervisor 424 can correspond to the hypervisor 224 in FIG. 2. The hypervisor 424 can communicate to virtual machines 1 through N through the switching device one. The virtual switch one 408 can correspond to virtual switch 226 from FIG. 2. Virtual switches one 408 through virtual switch N can connect a number of virtual machines to the hypervisor 424. Each virtual machine can correspond to the virtual machines 108 from FIG. 2. Users can access a particular virtual machine to perform a number of functions, including super administrator, i.e., root, functions.

During the dynamic assignment of an IP address to a virtual machine, the VM One 404 can send a Dynamic Host Configuration Protocol (DHCP) request which routes through the virtual switch 408 and onto the broader network. The DHCP server 410 can provide an IP address. As the traffic routes through the virtual switch 408 to VM One 404, the virtual switch 408 can maintain a reference to VM One 404 as being assigned the IP address, e.g., a database or the IP pool 412. The virtual switch 408 can also record a lease time of the DCHP request to understand when to release the IP address from the database.

The DHCP server 410 can be associated with an IP pool 412, e.g. an address pool. The IP pool 412 can be a database or compilation of IP addresses that is associated with a MAC address for a particular virtual machine. The IP pool 412 can be a type of the address pool discussed herein. The MAC address can be assigned for a particular vNIC and each virtual machine can have more than one vNIC. A pathway can exist between the virtual switch 408 and the IP pool 412.

The virtual switch 408 can access the IP pool 412 and screen or block an IP address or MAC address that originates from another virtual machine, e.g. virtual machine two 406. For example, the IP address can be assigned from the DHCP server 410 for both virtual machine one 404 and virtual machine two 406. An aspect of this disclosure is that the virtual switch 408 can access the IP pool 412, specifically the IP addresses or MAC addresses assigned to both virtual machine one 404 and virtual machine two 406. A virtual machine can be finished using the address in the IP pool 412 due to the DHCP server finishing the lease time of the address, e.g., within 6 hours. When the lease time expires, the address can be removed from the IP pool 412. By directly connecting to the IP pool 412, the virtual switch 408 can instantly check whether the address in the IP pool 412 is in use.

In the event that the IP address for virtual machine two 406 is improperly changed to the IP address for virtual machine one 404, then the virtual switch 408 can compare the IP address used by virtual machine two 406 to the assigned IP address for virtual machine one 404. In this way, the virtual switch 408 can detect a change or mis-configuration in the IP address by the virtual machine two 406. If the virtual machine two 406 is using an IP address different than the assigned IP address for virtual machine two 406, then the virtual switch 408 can determine a change. According to various embodiments, the virtual switch 408 can monitor the IP addresses in addition to comparing the IP addresses with those found in the IP pool.

Likewise, if the MAC address for the vNIC for virtual machine two 406 is changed to match that of the vNIC for virtual machine one 404, then the virtual switch 408 can compare the two MAC addresses. The virtual switch 408 can block the access to the hypervisor 424 or the hardware resources 402 as a result of virtual machine two 406 changing its IP address or MAC address to that of virtual machine one 404 or as a result of an initial incorrect configuration. The virtual switch 408 can work on either layer 2 or layer 3 communications. For example, the virtual switch 408 can monitor a MAC address in layer 2 or an IP address in layer 3 using a deep packet inspection.

Figure 5:
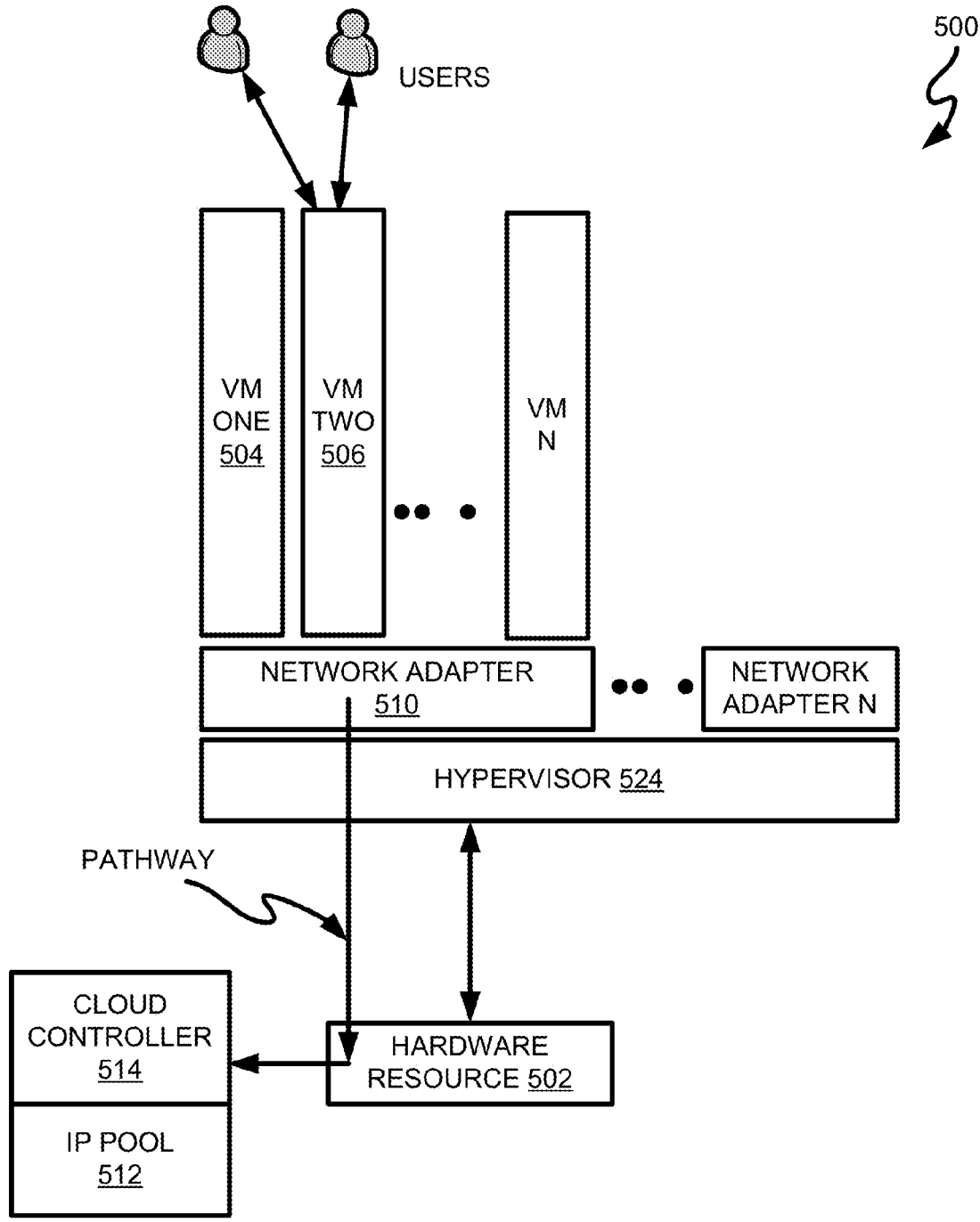
FIG. 5 illustrates a block diagram of a system that uses static assignment of IP addresses, according to various embodiments.

FIG. 5 illustrates a block diagram of a system 500 that uses static assignment of IP addresses, according to various embodiments. The system 500 can use a network hardware adapter 510 as the switching device and can correspond to the network hardware adapter 210 from FIG. 2. The results of the IP assignment can synchronize with the network hardware adapter 510. The system 500 can have components similar to those in FIG. 4, FIG. 3, and FIG. 2. For example, the hypervisor 524 can correspond to the hypervisor 224 from FIG. 2. The hypervisor 524 can communicate with the cloud controller 514. The cloud controller 514 can correspond to the cloud controller 214 in FIG. 2. The cloud controller 514 can access the IP pool 512, which can correspond to the IP pool 412 in FIG. 4.

The system 500 can also have virtual machine one 504, virtual machine two 506 through virtual machine N. The virtual machines can connect to the network hardware adapter one 510 through their respective vNICs. The network hardware adapter 510 can limit the access to the hypervisor 524 and the hardware resources 502 in a manner similar to that in FIG. 4.

The IP address can be assigned using a static assignment. In the static assignment of IP addresses, the IP address changes infrequently. A static assignment can involve the cloud controller 514 providing the used IP addresses from the IP pool 512. In various embodiments, the cloud controller 514 can also obtain IP addresses from a source in the IP pool 512. The cloud controller 514 can then create a virtual machine and upload metadata containing IP addresses from an external source, e.g., the mass storage device 214 from FIG. 2. IP addresses can be assigned to each virtual machine. In various embodiments, the cloud controller 514 can send IP addresses from the IP pool 512 to the activation engine of the virtual machines. For example, 500 addresses can be sent to 500 activation engines with a master reference to an addressing scheme.

Similar to embodiments in FIG. 4, the IP pool 514 can be accessed by the network hardware adapter 510, which can serve as a switching device and used to block virtual machines with unassigned MAC or IP addresses from accessing the hypervisor 524.

Figure 6:
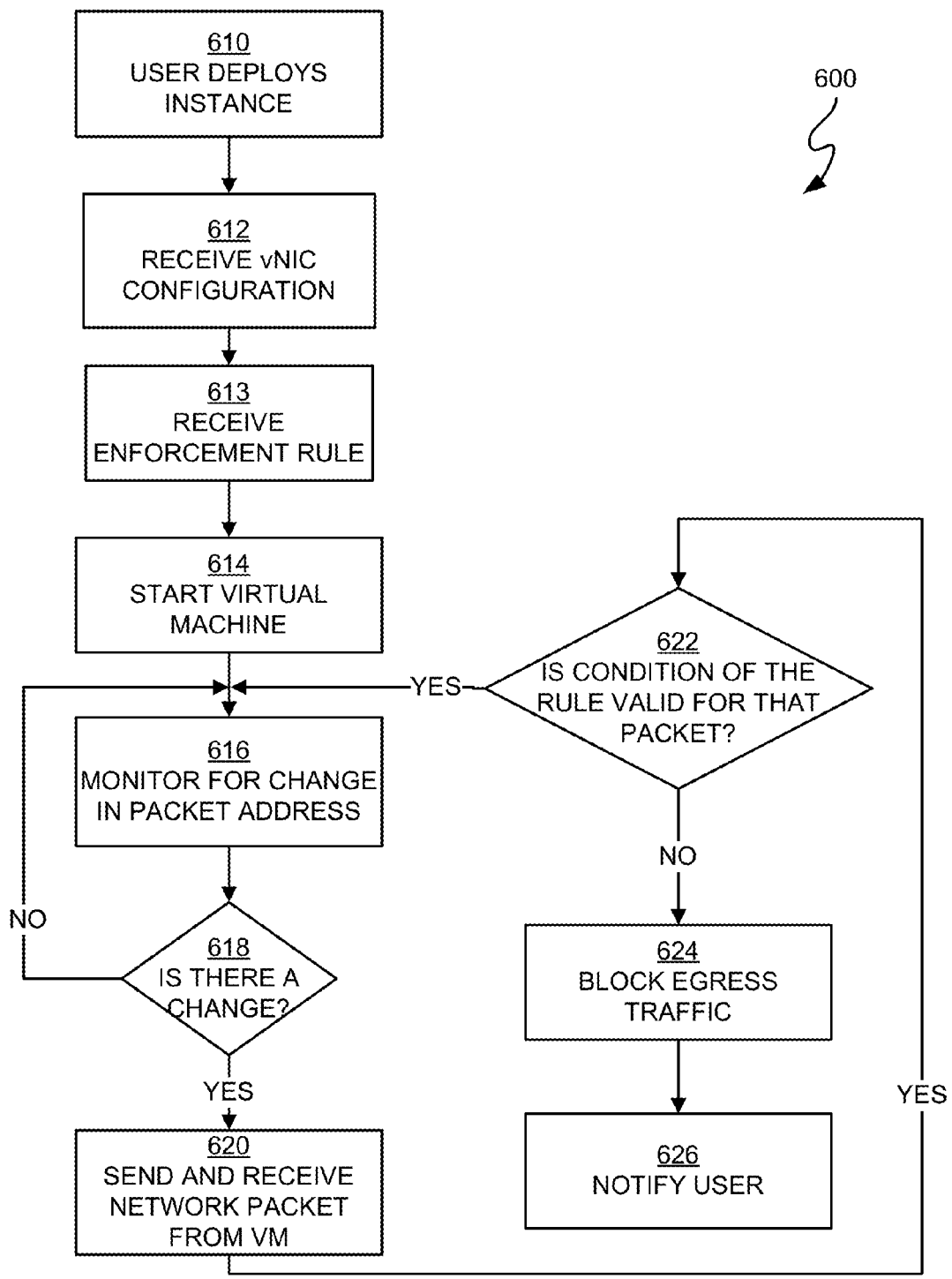
FIG. 6 illustrates a flowchart of a method of screening an IP address, according to various embodiments.

FIG. 6 illustrates a flowchart of a method 600 of screening an IP or MAC address, according to various embodiments. Generally, the method 600 can involve a switching device requesting IP addresses from an address pool with addresses populated, e.g., by using the DHCP technique described in FIG. 4, and use the IP addresses to block virtual machines without the assigned IP address. The method 600 can begin at operation 610.

In operation 610, a user can deploy an instance of a virtual machine. The deployment can be performed by the cloud controller. The virtual machine can be assigned an IP address using either the static, e.g., the technique described in FIG. 5, or dynamic assignment, e.g, the technique described in FIG. 4. In various embodiments, operation 610 can be optional and the deployment can occur from a host. After an instance is deployed, then the method 600 can continue to operation 612.

In operation 612, a cloud controller or hypervisor can upload the IP addresses associated with each virtual machine to a switching device. The switching device can refer to the virtual switch 226, the network hardware adapter 210, or network switch 228 in FIG. 2. The switching device can receive vNIC configuration data from the vNICs of the virtual machines which indicates the IP address being used by the virtual machine. After the IP addresses are uploaded, then the method 600 can continue to operation 613.

In operation 613, the cloud controller can receive an enforcement rule or an access control list for the switching device. The enforcement rule can also refer to an access control list or a firewall rule, according to various embodiments. The enforcement rule can also be the IP and MAC addresses from the address pool discussed herein. The enforcement rule can be created by the cloud controller or DHCP server discussed herein.

The enforcement rule or access control list can be based off of the vNIC configuration. For example, the switching device can receive the listing of MAC addresses that correspond to each vNIC of each virtual machine. The MAC addresses that are received in operation 612 can be used to create the enforcement rule. The enforcement rule can be a particular rule that allows the switching device to screen out virtual machines that have MAC addresses that match an assigned MAC address of an another virtual machine, e.g., the MAC address received from operation 612. Thus, an example of the enforcement rule can be: If All VMs mac_addresses.count(VM1 mac)>1 OR All Vms.getByMac (VM1.mac)!=VM1. A similar enforcement rule can occur using IP addresses instead of MAC addresses. After the enforcement rule is received, then the method 600 can continue to operation 614.

In operation 614, the cloud controller in cloud-based environments can start the virtual machine. The virtual machine can perform the functions described further herein and can access network. After the virtual machine is started, then the method 600 can continue to operation 616.

In operation 616, the switching device can monitor the traffic from the virtual machine for a change in the source or destination of a packet address. The packet address can be changed by a user of the virtual machine. The change can involve the user changing the IP or MAC address of a virtual machine to that of another virtual machine on the network. In certain configurations, the change can deactivate both virtual machines or potentially steal traffic from the other application. The change can also take place because of a resident application that changes the IP or MAC address. For example, a networking application that independently cycles through a variety of IP addresses in a sequence can change the IP address to an IP address used by a virtual machine on the network without user input. Similarly, in some cases, the operator of the cloud environment may give their customers superuser access to their VM images. In various embodiments, operation 616 can be optional since it can be possible that two or more virtual machines have the same IP address as an initial state and therefore would not be changed to that of another virtual machine. After operation 616, then the method 600 can continue to operation 618.

In operation 618, the switching device can determine whether there has been a change in the packet address. For example, a change can exist when the MAC address for a second vNIC for a second virtual machine is changed to that of a first vNIC for a first virtual machine. If the change exists, then the method 600 can continue to operation 620. According to various embodiments, the change could also be from an incorrect state to a correct state, i.e. where the assigned address matches the address used by the virtual machine. If the address is changed back into a correct state, then the method 600 can continue to operation 616. If the change does not exist, then the method 600 can continue to operation 616 where the switching device will continue to monitor for changes in the network configuration.

In operation 620, the virtual machine can send the packet to the network and the switching device can receive the network packet from the virtual machine. Specifically, the virtual machine can communicate through its vNIC to the switching device. The packet can indicate via metadata the configuration settings of the originating virtual machine. The switching device can further communicate with the hypervisor. The virtual machine can also be the destination of a network packet and receive the network packet from the switching device. After the packet is received by the switching device, the method 600 can continue to operation 622.

In operation 622, the switching device can check the condition of the enforcement rule to determine if the condition is valid for the packet. The condition of the enforcement rule can be an IP or a MAC address, according to various embodiments. The enforcement rule can be determining whether the IP or MAC address matches the assigned IP or MAC address. Thus, operation 622 can involve the determination of whether the IP or MAC address used by the virtual machine is the assigned IP or MAC address from the address pool. For example, a valid condition can be a network configuration that has the IP address of a first virtual machine match the assigned IP address for the first virtual machine from the IP address pool.

In various embodiments, the switching device can check every IP address used by the virtual machines is the assigned IP address for the virtual machines. The switching device can access the address pool. The switching device can perform a deep packet inspection to ensure that the IP address used by the virtual machine is the same as the assigned IP address from the address pool. In various embodiments, the switching device can compare the MAC address from the vNIC against the assigned MAC address in the address pool. The switching device can operate in layer 2 to inspect MAC addresses, while deep packet inspection of IP addresses allows layer 3 communication. The switching device can perform a quick check of the IP address. If the IP address from one virtual machine is the same as the IP address assigned to another virtual machine, then the condition is not valid and the method 600 can continue to operation 624.

If the condition is valid, then the method 600 can continue to operation 616. The switching device can, after finding a valid condition of the rule, route the request for data and transmission of data to the hypervisor. The hypervisor can connect the traffic further to the intended destination using the hardware resource.

In operation 624, the switching device can block egress network traffic originating from the vNIC. Egress traffic can be the traffic that originates from the vNIC and connect to various hardware components through the hypervisor. For example, if a used IP address from a first virtual machine is the same as an assigned IP address for a second virtual machine, then the switching device can block all egress traffic from the first virtual machine but not the second virtual machine. The screening can isolate the traffic from the first virtual machine without affecting the second virtual machine. According to various embodiments, in addition to the blocking of the egress traffic, the ingress traffic directed towards the virtual machine can be blocked. Using the aforementioned example, any external traffic from an outside network can be blocked from transmitting data to the first virtual machine.

The switching device can prevent the vNIC with the invalid IP or MAC address from accessing the network or the hypervisor. According to various embodiments, the switching device can also deactivate the violating vNIC and avoid having to spend CPU cycles on blocking the egress traffic. After the egress traffic is blocked, then the method 600 can continue to operation 626.

In operation 626, the switching device can notify the user or the system administrator. According to various embodiments, the system administrator can be a type of user. In the static IP selection method, each IP address is static for a virtual machine. Therefore, the virtual machine with a duplicate IP address can be identified. The switching device can notify the cloud controller that the duplicate IP address is being used by an unassigned virtual machine. The cloud controller can also further pinpoint the user that made the changes to the virtual machine.

Figure 7:
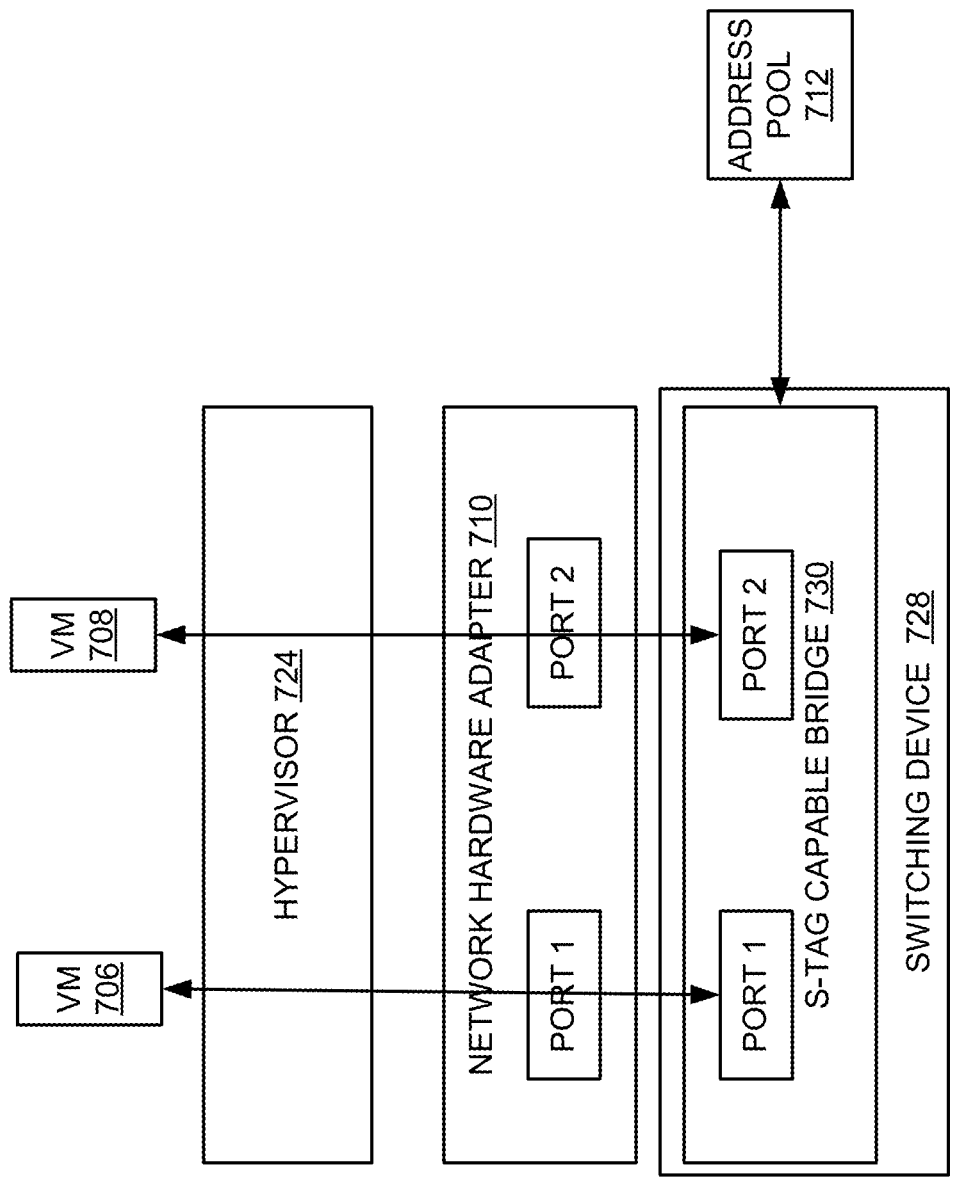
FIG. 7 illustrates a block diagram of a switching device that screens unauthorized virtual machines from accessing the network, according to various embodiments.

FIG. 7 illustrates a block diagram of a switching device 728 that screens unauthorized virtual machines from accessing the network, according to various embodiments. The switching device 728 can correspond to the network switch 228 from FIG. 2. According to various embodiments, the switching device 728 can employ the IEEE™ 802.1 Qbg standard or IEEE™ 802.1 Qbh standard. In the IEEE™ 802.1 Qbg standard, ports can be formed on the network hardware adapter 710 to the s-tag capable bridge 730 on the switching device 728. The virtual machine 706 communication can be piped through port 1 via the hypervisor 724 and network hardware adapter 710 directly into the switching device 728. A similar piping can occur with virtual machine 708 using port 2. The s-tag capable bridge 730 can be configured to screen the MAC or IP addresses from the virtual machines, 706, 708.

For example, if the MAC address for the vNIC is changed by the virtual machine 708 user to match that of the vNIC for virtual machine 706, then the s-tag capable bridge 730 can be configured to access an address pool 712 and screen out unauthorized vNICs from using the assigned MAC address. The address pool 712 can contain a listing of IP and MAC addresses for vNICs and virtual machines. The s-tag capable bridge 730 can use an Application-Specific Integrated Circuit (ASIC) to both access the address pool 712 and perform the screening function. It can also be possible for the s-tag capable bridge 730 to have the components necessary to perform the screening function uploaded to firmware of the s-tag capable bridge 730.

Figure 8:
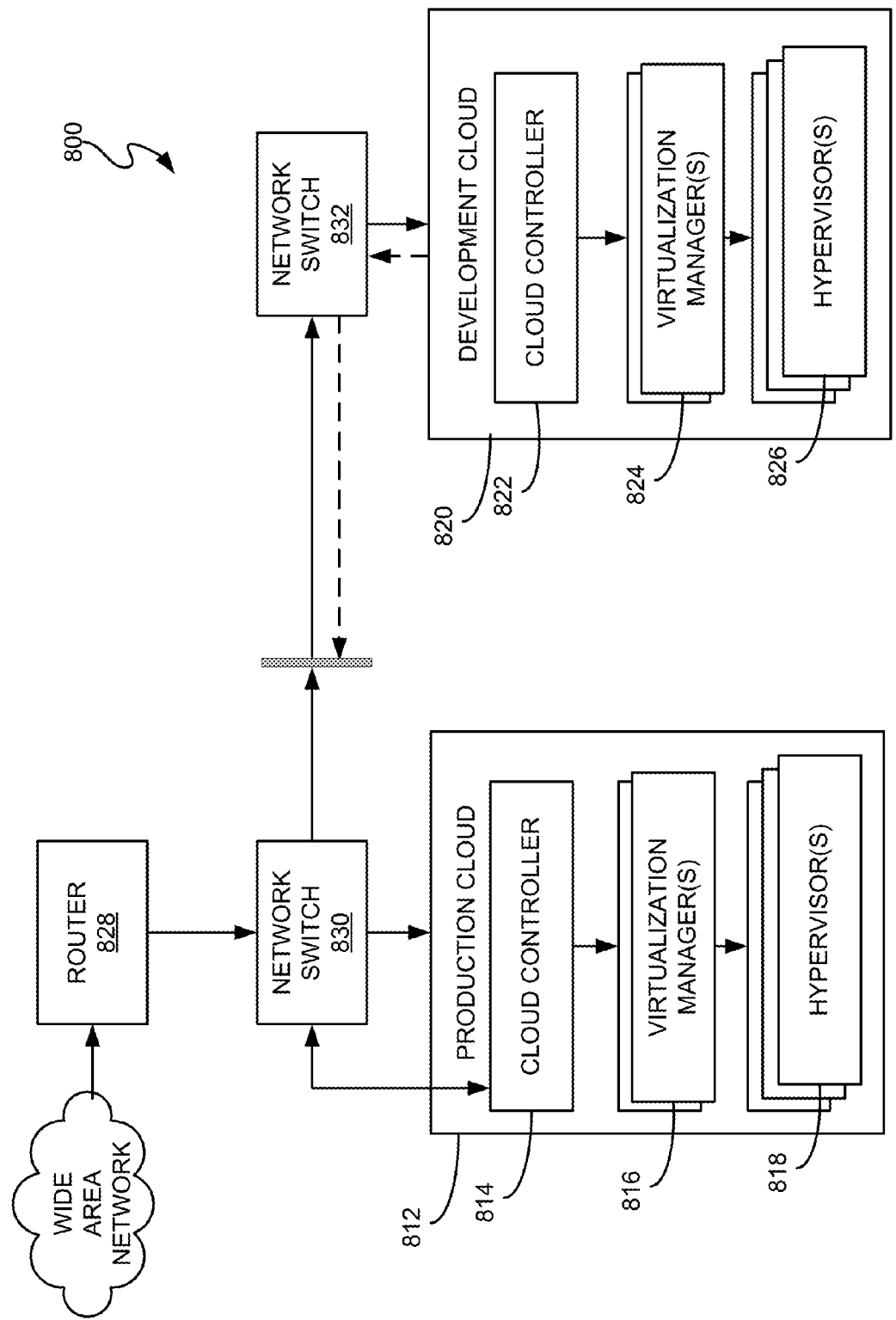
FIG. 8 illustrates a system that uses a screening function on one of the network switches, according to various embodiments.

FIG. 8 illustrates a system 800 that uses a screening function on one of the network switches, according to various embodiments. The system 800 can include a router 828, network switches 830 and 832, and a production cloud 812 and a development cloud 820. The production cloud 812 and the development cloud 820 can each have their own independent cloud networks, similar to the network 106 in FIG. 1. The network switch 830 can be configured to include the screening function and screen the production cloud 812 from actions in the development cloud 820. In various embodiments, the network switch 830 can be configured so that the network switch 830 blocks access to the production cloud.

The network switch 830 can be similar to the network switch 228 from FIG. 2. The network switch 830 can also be configured to obtain the IP addresses or MAC addresses from an address pool managed by the cloud controller 814 in the production cloud 812. The network switch 830 can also check the traffic originating from the development cloud 820 against the IP addresses in the production cloud 812. Although the network switch 830 is shown communicating with the production cloud 812. The network switch 830 can also communicate with an address pool in the development cloud 820 simultaneously. As mentioned herein, the address pool can be a listing or database of the various MAC and IP addresses used by the virtual machines or vNICs in the development cloud 820 or production cloud 812.

The system 800 can include a router 828 can route a wide area network traffic to the production cloud 812 or the development cloud 820 through network switches 830, 832. The development cloud 820 can access the wide area network through the network switch 832. The network switch 830 can control a port that connects wide area network traffic from network switch 832 to the router 828, according to various embodiments.

The production cloud 812 and the development cloud 820 can each resemble the data center network 106 from FIG. 1. The production cloud 812, and development cloud 820 can each have a cloud controller 814, 822, a virtualization manager 816, 824, and a hypervisor 818, 826. The virtualization manager 816, 824, can control the allocation of one or more hypervisors 818, 826. Each hypervisor 818, 826, can allocate hardware resources to one or more virtual machines.

The production cloud 812 and the development cloud 820 can process data within the respective cloud. If only one network switch has the screening function, e.g., the network switch 830, then the system 800 will continue to screen IP or MAC addresses for the network switch associated with the cloud, e.g., the production cloud 812. For example, if a virtual machine user on the development cloud 820 changes the IP address of the virtual machine to that of a virtual machine on the production cloud 812, then the traffic directed to the development cloud 820 can be blocked by the network switch 830.

As an example, if a virtual machine from the production cloud 812 (herein "production virtual machine") and a virtual machine from the development cloud 820 (herein "development virtual machine") share the same IP address, then the network switch 830 can retrieve the IP address. The network switch 830 can determine which virtual machine is assigned the IP address. Assuming that the production virtual machine is assigned the IP address, then the network switch 830 can block the port of the network switch 832 from accessing the router 828. Thus, the development virtual machine will not receive any traffic intended for the production virtual machine.

In various embodiments, the address pool can include a timestamp of when a virtual machine is assigned a particular IP address. The timestamp can help resolve simultaneous assignment. For example, if the production virtual machine is assigned the same IP address after the development virtual machine is assigned the IP address, then the network switch 830 can give access to the development virtual machine and screen the production virtual machine. In various embodiments, a default setting of giving the production cloud priority can be implemented.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud computing model generally includes at least five characteristics, at least three service models, and at least four deployment models.

The Five Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is generally service oriented, with a focus on statelessness, low coupling, modularity, and semantic interoperability. At the heart of cloud computing is an infrastructure comprising a network of interconnected nodes.

Figure 9:
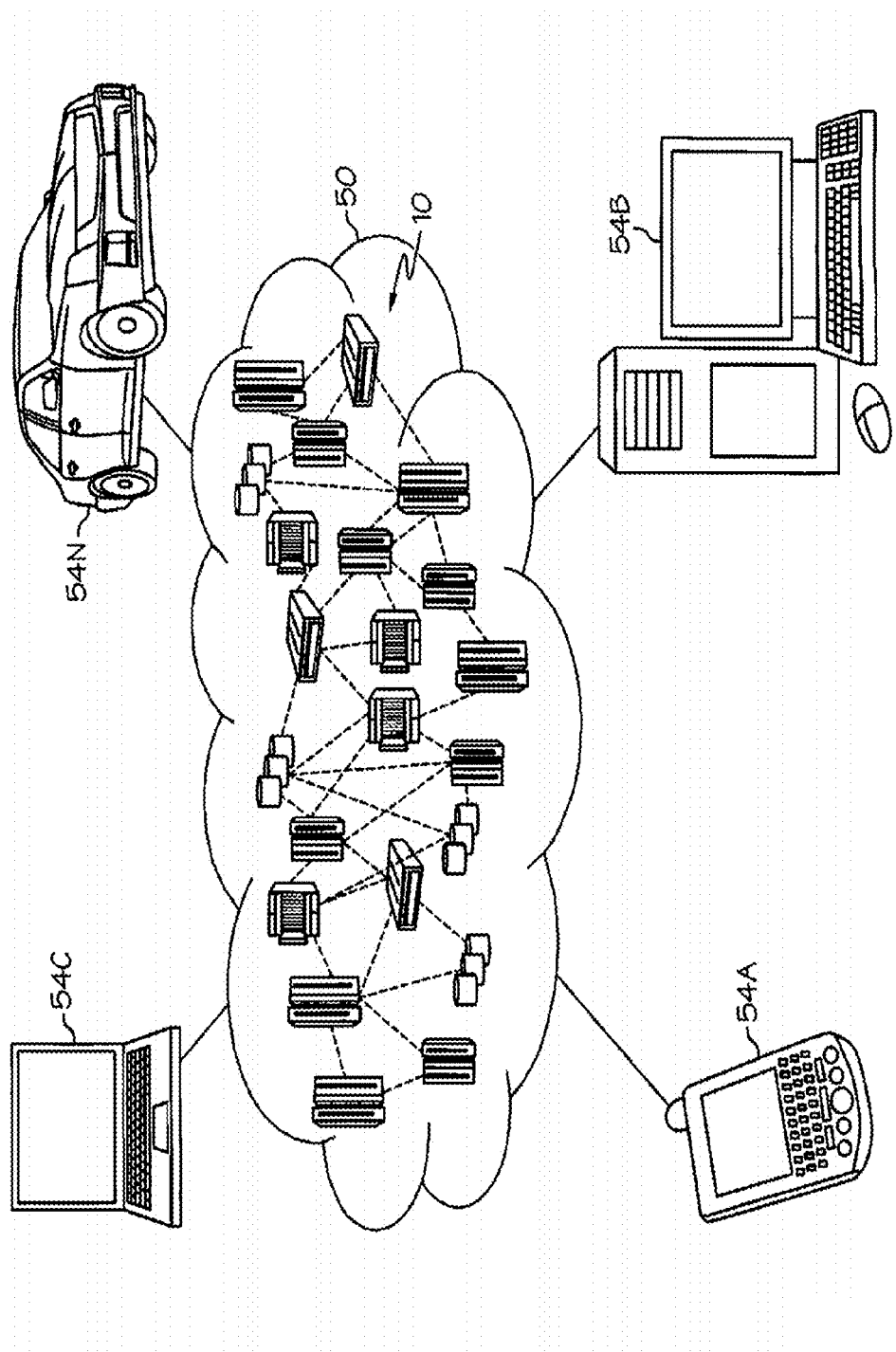
FIG. 9 illustrates a cloud computing environment, according to various embodiments.

FIG. 9 illustrates a cloud computing environment 50, according to various embodiments. As shown, cloud computing environment 50 comprises one or more cloud computing nodes 10 with which local computing devices 54 used by cloud consumers, such as, for example, personal digital assistant (PDA) or cellular telephone 54A, desktop computer 54B, laptop computer 54C, and/or automobile computer system 54N can communicate. In various embodiments, the local computing devices 54 can be REDs. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device 54. It is understood that the types of local computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
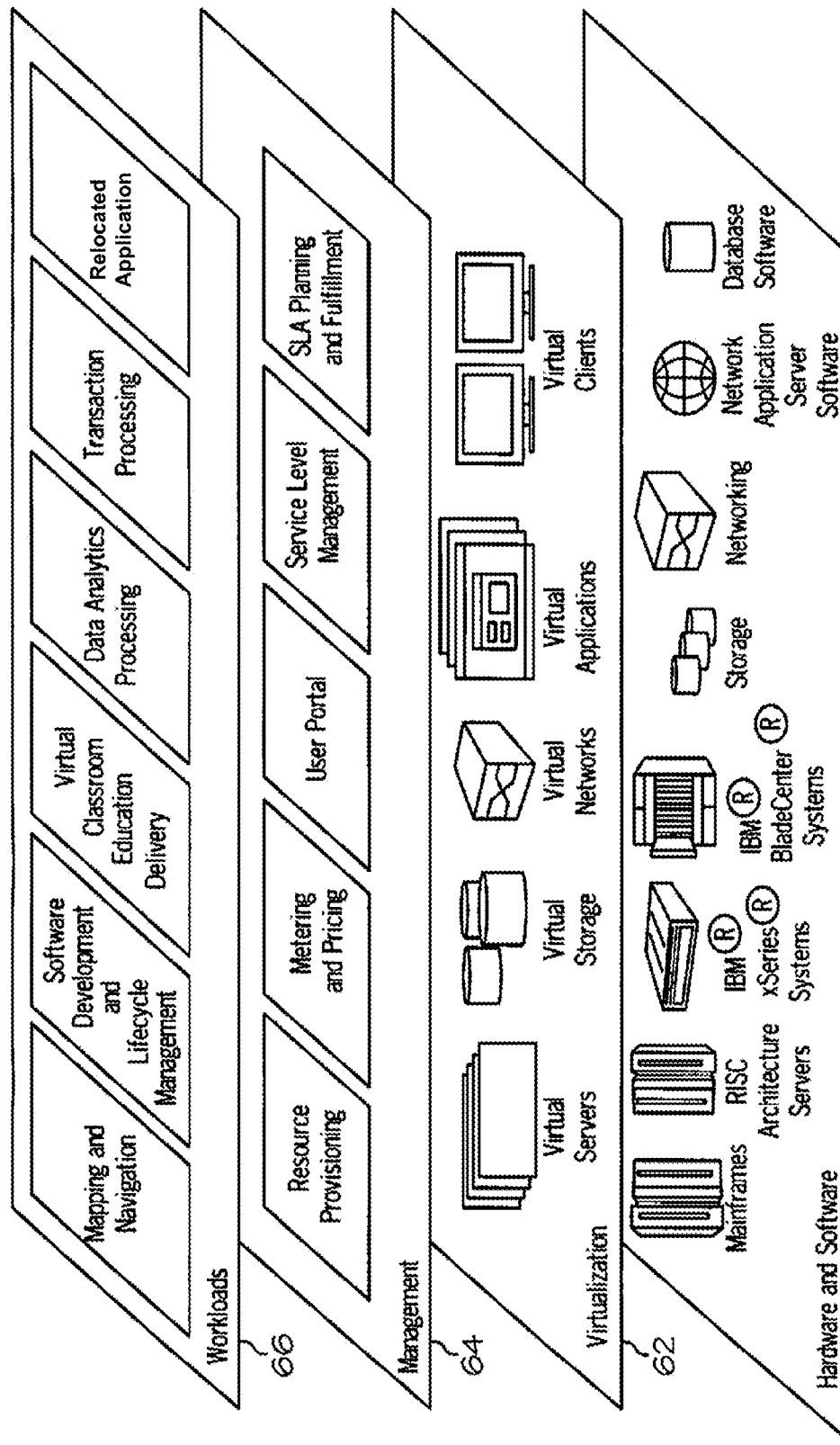
FIG. 10 illustrates a set of functional abstraction layers provided by the cloud computing environment, according to various embodiments.

FIG. 10 illustrates a set of functional abstraction layers provided by the cloud computing environment 50 (FIG. 9), according to various embodiments. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities can be provided: virtual servers; virtual storage; virtual networks, including virtual private networks; virtual applications and operating systems; and virtual clients.

In one example, management layer 64 can provide the functions described herein. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment can provide pre-arrangement for, and procurement of, cloud computing resources for which a future requirement is anticipated in accordance with an SLA.

Workloads layer 66 provides examples of functionality for which the cloud computing environment can be utilized. Examples of workloads and functions which can be provided from this layer include: mapping and navigation; software development and lifecycle management; virtual classroom education delivery; data analytics processing; transaction processing; and an application relocated from a remote device.

The above embodiments and examples of managing inputs from multiple users are not meant to be limiting. A variety of methods for managing inputs and usage of a virtual application are contemplated and considered in the scope of the invention.

Exemplary embodiments have been described in the context of a fully functional system for relocating an application from a remote electronic device to a virtualization-based environment and managing the inputs from and outputs to one or more remote electronic devices once relocated. Readers of skill in the art will recognize, however, that embodiments also can include a computer program product disposed upon computer-readable storage medium or media (or machine-readable storage medium or media) for use with any suitable data processing system or storage system. The computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer or storage system having suitable programming means will be capable of executing the steps of a method disclosed herein as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the claims.

As will be appreciated by one skilled in the art, aspects can be embodied as a system, method, or computer program product. Accordingly, aspects can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects can take the form of a computer program product embodied in one or more computer readable medium(s) having computer readable program code embodied thereon.

Any combination of one or more computer readable medium(s) can be used. The computer readable medium can be a computer-readable signal medium or a computer-readable storage medium. The computer readable signal medium or a computer readable storage medium can be a non-transitory medium in an embodiment. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wire, optical fiber cable, RF, etc., or any suitable combination of the foregoing.

Computer program code for carrying out operations for aspects can be written in any combination of one or more programming languages, including an object-oriented programming language such as Java™, Smalltalk™, C++ or the like and conventional procedural programming languages, such as the C programming language or similar programming languages. The program code can execute entirely on the user's computer, partly on the user's computer, as a stand-alone software package, or on one module or on two or more modules of a storage system. The program code can execute partly on a user's computer or one module and partly on a remote computer or another module, or entirely on the remote computer or server or other module. In the latter scenario, the remote computer other module can be connected to the user's computer through any type of network, including a local area network (LAN) or a wide area network (WAN), or the connection can be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions can also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terms "server and "mobile client" are used herein for convenience only, and in various embodiments a computer system that operates as a mobile client computer in one environment can operate as a server computer in another environment, and vice versa. The mechanisms and apparatus of embodiments of the present invention apply equally to any appropriate computing system, including a computer system that does not employ the mobile client-server model.

While this disclosure has described the details of various embodiments shown in the drawings, these details are not intended to limit the scope of the invention as claimed in the appended claims.

What is claimed is:

1. A computing system for screening addresses in a cloud computing environment, comprising:
   a plurality of virtual machines, wherein each virtual machine includes a virtual network interface card (vNIC) that maps to a network hardware adapter;
   an address pool that includes a plurality of assigned addresses, wherein an address of the plurality of assigned addresses is assigned for each virtual machine of the plurality of virtual machines, wherein the assigned address is given to a first virtual machine of the plurality of virtual machines for configuring purposes;
   a memory;
   a computing processor communicatively coupled to the memory; and
   a virtual switch (vSwitch) that connects one or more virtual machines of the plurality of virtual machines to a hypervisor and wherein the vSwitch is configured to provide access to a physical function of the network hardware adapter to the plurality of virtual machines operating on one or more computing processors and communicatively coupled to the plurality of virtual machines, wherein the vSwitch is configured to:
   receive vNIC configuration data from the address pool, wherein the vNIC configuration data indicates an assigned address of each vNIC for a second virtual machine wherein the assigned address in the address pool is created by a cloud controller;

receive an enforcement rule for the vSwitch, wherein the enforcement rule allows the vSwitch to block a third virtual machine with a first vNIC that has a used address matching an assigned address of a second vNIC for a fourth virtual machine, wherein the used address is a packet address for a source of a network packet from a fifth virtual machine, and wherein the used address is a Media Access Control (MAC) address;

receive the network packet from the third virtual machine through the first vNIC, the network packet indicates configuration settings of the third virtual machine via metadata;

determine that the enforcement rule applies to the network packet; and enforce the enforcement rule by blocking the network packet from the third virtual machine to an intended destination the enforcement rule applies to the network packet; and notify a system administrator, selected from the plurality of virtual machines, that the traffic from the first virtual machine is blocked.

2. The computing system of claim 1, wherein the vSwitch is further configured to:

rout traffic from the first virtual machine to the intended destination if the enforcement rule does not apply to the network packet.

3. The computing system of claim 1, wherein the vSwitch operates in layer 2.

4. The computing system of claim 1, wherein the address pool includes an available address that is an address available to a sixth virtual machine, wherein the address available to the sixth virtual machine is different than the assigned address for each of the virtual machines of the plurality of virtual machines.

5. A system for managing an address on a virtual switch (vSwitch), comprising:

a memory;

a plurality of virtual machines, wherein each virtual machine includes a virtual network interface card (vNIC) that maps to a network hardware adapter;

an address pool that includes a plurality of assigned addresses, wherein an address of the plurality of assigned addresses is assigned for each virtual machine of the plurality of virtual machines;

a computing processor communicatively coupled to the memory; and a virtual switch that connects one or more virtual machines to a hypervisor and wherein the vSwitch provides access to a physical function of the network hardware adapter to the plurality of virtual machines operating on one or more computing processors, wherein the vSwitch is configured to:

receive a network packet from a first virtual machine, the network packet having configuration settings of the first virtual machine, the configuration settings including an address of the first virtual machine;

determine an assigned address for the first virtual machine;

determine whether a received address is matching the assigned address;

block the network packet from a vNIC via a hypervisor in response to the received address not matching the assigned address;

receive vNIC configuration data from the address pool, wherein the vNIC configuration data indicates an assigned address of each vNIC for a second virtual machine wherein the assigned address in the address pool is created by a cloud controller;

receive an enforcement rule for the vSwitch, wherein the enforcement rule allows the vSwitch to block a third virtual machine with a first vNIC that has a used address matching an assigned address of a second vNIC for a fourth virtual machine, wherein the used address is a packet address for a source of a second network packet from a fifth virtual machine, and wherein the used address is a Media Access Control (MAC) address;

receive the second network packet from the third virtual machine through the first vNIC, the second network packet indicates configuration settings of the third virtual machine via metadata;

determine that the enforcement rule applies to the second network packet;

enforce the enforcement rule by blocking the second network packet from the third virtual machine to an intended destination if the enforcement rule applies to the second network packet; and notify a system administrator, selected from the plurality of virtual machines, that the traffic from the first virtual machine is blocked.

6. The system of claim 5, wherein the vSwitch is configured to determine an assigned address by:

sending a Dynamic Host Configuration Protocol (DHCP) request to a DHCP server; and receiving the assigned address for the first virtual machine from the DHCP server.

7. The system of claim 5, wherein the vSwitch is configured to receive a network packet by:

monitoring the network packet using a deep packet inspection, wherein the address is an internet protocol address and the virtual switch works in layer 3.

8. The system of claim 5, wherein the vSwitch is provided as a service in a cloud environment.

* * * * *